United States Patent [19] [11] Patent Number: 5,037,126
Gottschalk et al. [45] Date of Patent: Aug. 6, 1991

[54] LIGHTWEIGHT BEAM SUSPENSION SYSTEM

[75] Inventors: Michael J. Gottschalk; Michael J. Keeler; John E. Ramsey, all of Canton; Ervin K. Van Denberg, North Canton, all of Ohio

[73] Assignee: The Boler Company, Itasca, Ill.

[21] Appl. No.: 578,780

[22] Filed: Sep. 7, 1990

[51] Int. Cl.$^5$ .............................................. B60G 11/26
[52] U.S. Cl. ................................... 280/688; 280/713; 280/711
[58] Field of Search ............... 280/713, 711, 683, 678, 280/688

[56] References Cited

U.S. PATENT DOCUMENTS

| | | | |
|---|---|---|---|
| 2,352,446 | 6/1944 | Pointer | 280/711 |
| 2,367,817 | 1/1945 | Brown | 280/711 |
| 2,879,076 | 3/1959 | Stricker, Jr. | 280/711 |
| 2,879,077 | 3/1959 | Chalmers | 280/711 |
| 2,882,067 | 4/1959 | Gouirand | 280/711 |
| 2,952,474 | 9/1960 | Gouirand | 280/711 |
| 3,120,396 | 2/1964 | Nallinger et al. | 280/711 |
| 3,434,707 | 3/1969 | Raidel | 280/711 |
| 3,828,881 | 8/1974 | Owen | 180/75 |
| 3,861,708 | 1/1975 | Fier | 280/711 |
| 4,132,433 | 1/1979 | Willetts | 280/712 |
| 4,195,856 | 4/1980 | Larson et al. | 280/704 |
| 4,261,597 | 4/1981 | VanDenberg | 280/711 |
| 4,293,145 | 10/1981 | Taylor | 280/711 |
| 4,427,213 | 1/1984 | Raidel | 280/711 |
| 4,494,771 | 1/1985 | Raidel | 280/711 |
| 4,501,437 | 2/1985 | Becker | 280/704 |
| 4,529,224 | 7/1985 | Raidel | 280/711 |
| 4,541,653 | 9/1985 | Raidel | 280/711 |
| 4,566,719 | 1/1986 | VanDenberg | 280/711 |
| 4,615,539 | 10/1986 | Pierce | 280/713 |
| 4,722,549 | 2/1988 | Raidel | 280/711 |
| 4,763,923 | 8/1988 | Railde | 280/704 |
| 4,768,808 | 9/1988 | De Rees | 280/796 |
| 4,991,868 | 2/1991 | Vandenberg | 280/711 |

FOREIGN PATENT DOCUMENTS

| | | | |
|---|---|---|---|
| 650987 | 10/1962 | Canada | 280/711 |
| 3521856 | 1/1981 | Fed. Rep. of Germany | 280/711 |
| 3333171 | 3/1985 | Fed. Rep. of Germany | 280/711 |
| 1132451 | 3/1957 | France | 280/711 |
| 1140636 | 7/1957 | France | 280/711 |
| 302468 | 10/1965 | Netherlands | 280/711 |
| 2068856 | 8/1981 | United Kingdom | 280/711 |

OTHER PUBLICATIONS

XD-1212 Blueprint of Prior Art Suspension Design of Turner QuickLift Corp.
XD-1213-2 Blueprint of Prior Art Suspension Design of Turner QuickLift Corp.
XD-1225-3 Blueprint of Prior Art Suspension Design of Turner QuickLift Corp.
XD-1242-5 Blueprint of Prior Art Suspension Design of Turner QuickLift Corp.

Primary Examiner—Charles A. Marmor
Assistant Examiner—Michael Shaughnessy
Attorney, Agent, or Firm—Myers, Rose & Liniak

[57] ABSTRACT

An axle suspension system for a wheeled vehicle is disclosed. The system includes a frame, a frame connection member, a beam assembly, a torque box and an air bag connection. The beam assembly is lightweight, cost effective, and efficient because the beam assembly utilizes a box beam structure in conjunction with the torque box structure which provides for substantially even distribution of axle deflections throughout the entire beam assembly.

9 Claims, 5 Drawing Sheets

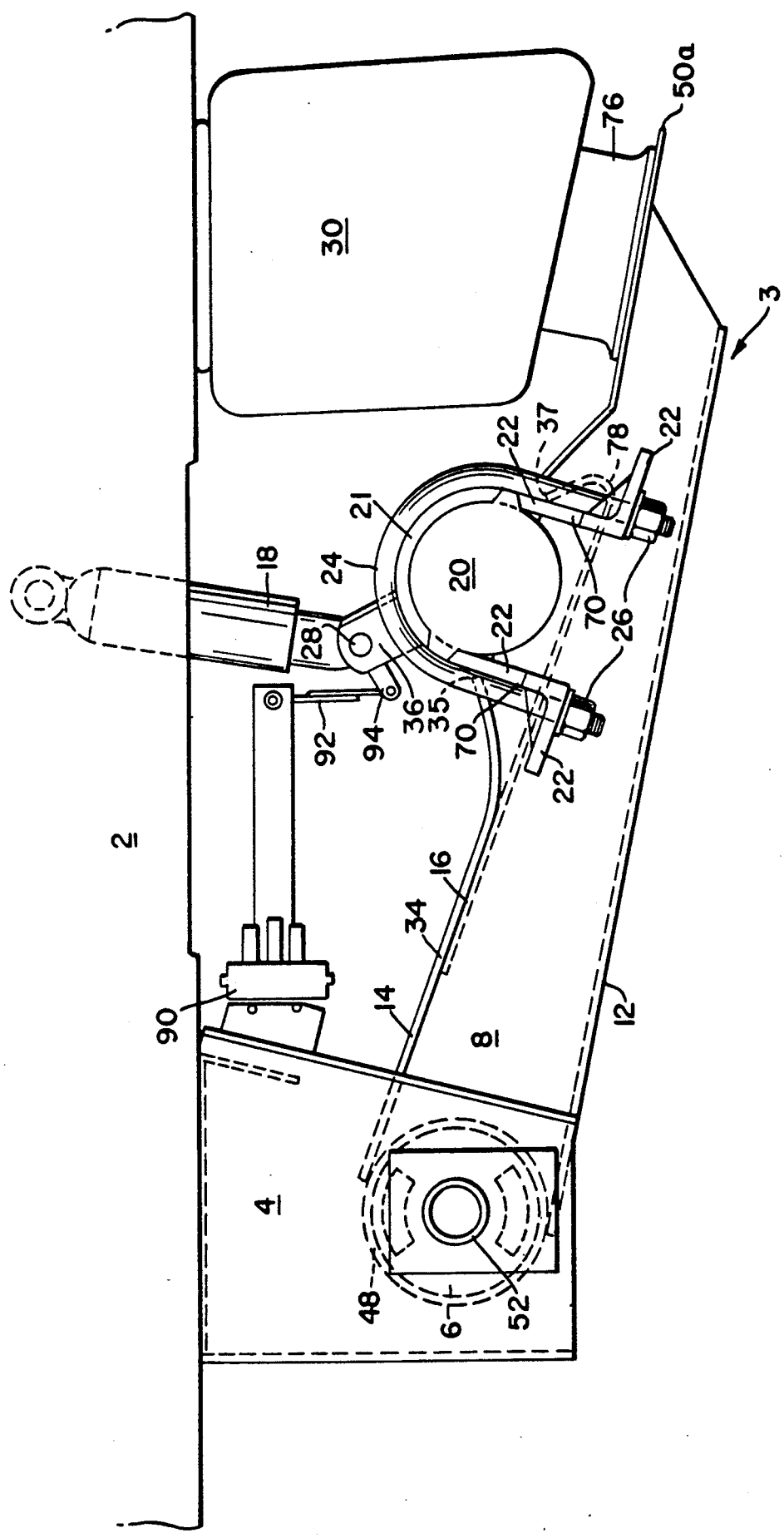

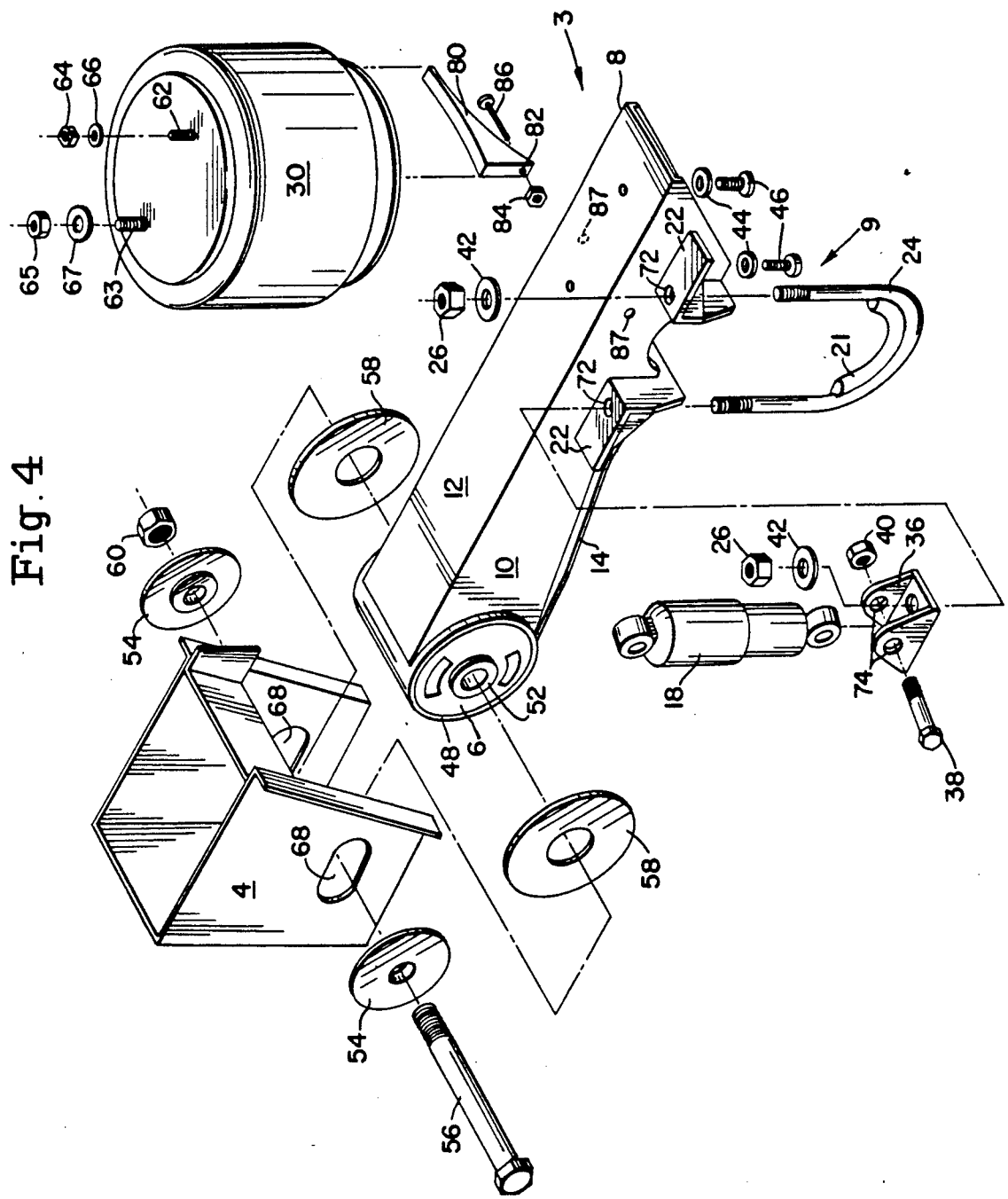

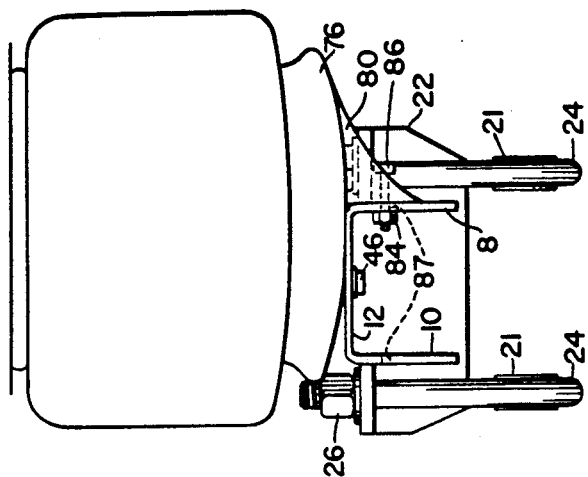
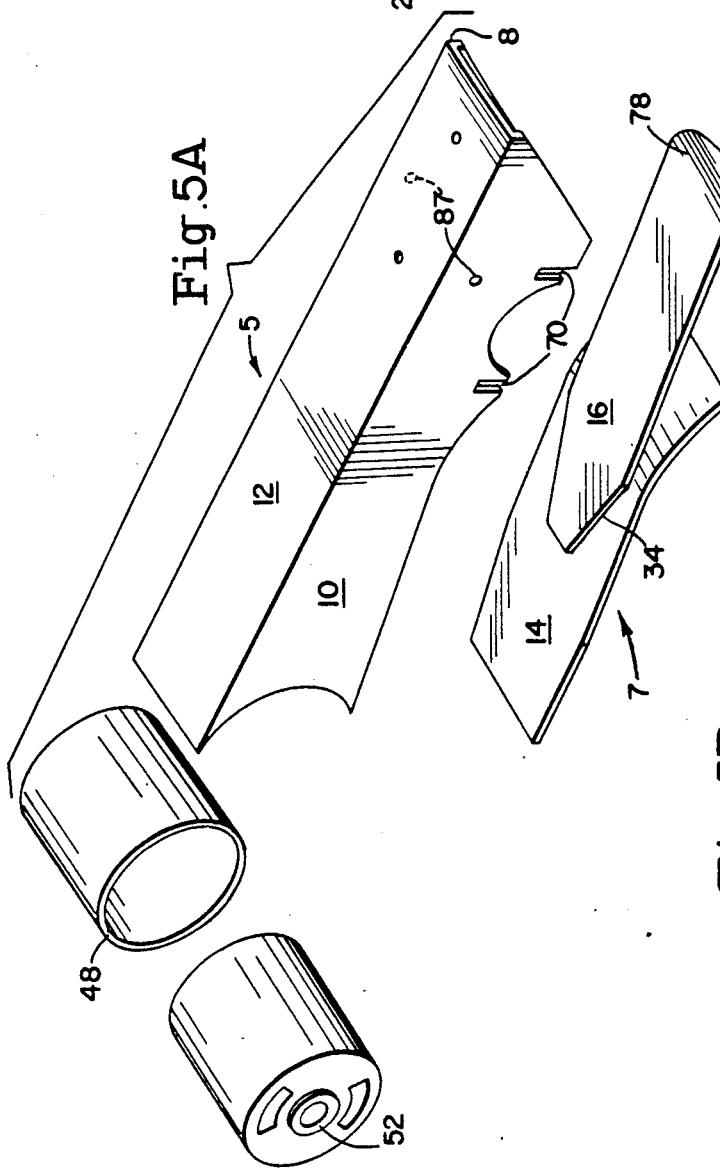
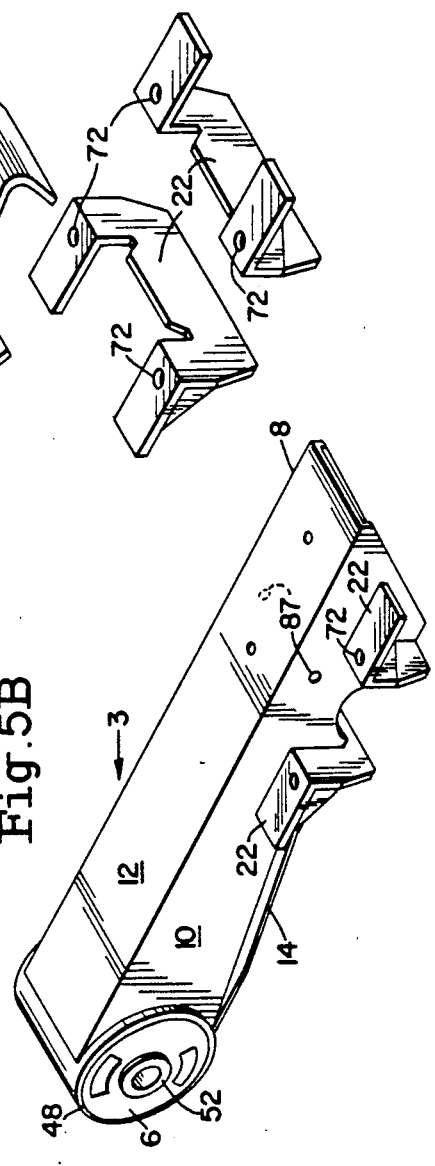

LIGHTWEIGHT BEAM SUSPENSION SYSTEM

BACKGROUND OF THE INVENTION

The invention relates to vehicle axle suspension systems of the type that have beam assemblies constructed of several individual pieces, which are rigidly attached together, in order to form an integral structure. Such structures of this type generally allow substantially all forces or deflections that are experienced by the axle to be transmitted to a frame connection member. An axle which carries ground-engaging wheels is secured to the beam assembly, and an air bag or similar system is disposed in load-transmitting relation between the assembly and the vehicle frames, at the end of the beam opposite a pivot connection. This invention relates to certain unique beam assemblies and axle connections to the beam, and force transferral means in association therewith.

It is known, in beam-type suspension systems, to make use of a system including a vehicle frame, a hanger bracket, a beam, an axle seat, and an air spring, to transfer the forces experienced by the ground-engaging wheels through the axle seat to the beam, and thereafter into the appropriate frame member of the vehicle. In each of these cases, a connection has been used between the axle and the beam, with the intention of transferring those forces to the beam in a safe and efficient manner. Not all have been successful in this regard.

Exemplary of such prior art vehicle suspension systems achieving a modicum of success in this regard are U.S. Pat. Nos. 4,615,539 to Pierce; 2,879,076 to Stricker, Jr.; and 4,261,597 and 4,566,719, both to VanDenberg. The Pierce and Stricker, Jr. patents disclose a vehicle suspension system in which the forces experienced by the ground-engaging wheels are transferred from the axle to the beam by means of gusset plates or, alternatively, axle seats. While these systems have met with a degree of commercial success, they are made up, of necessity, of numerous parts. The shear number of these parts and their complex arrangement, are necessary to properly transfer many of the forces from the axle to the suspension beam while allowing adequate and appropriate deflections so that damage to the axle and suspension beam do not occur. Some of the forces, resulting from deflections caused by uneven road surfaces, are distributed throughout the gusset plates or axle seat, and result in various distributed and concentrated loading into the suspension beam components. In addition, the number and size of the parts involved add significant weight to the suspension. The absorbing of a significant amount of deflections experienced in a high stress situation, by any part, including the gusset plate and axle seat, other than the elastic bushing at the pivot in the hanger leading to the frame member, is undesirable. A more advantageous system which would be the desirable low stress situation would be presented if the forces were not absorbed by the gusset plates or axle seats. Consequently, if not individually highly stressed, the gusset plates or axle seats transmit the forces required to control the vehicle attitude to the suspension beams. Therefore, the axle seat is not overstressed when transmitting forces between axle and beam.

In the VanDenberg patents ('597) and ('719), extra elements are employed to secure the beam to the axle, usually by welding to the axle, in order to provide the necessary attachment means for the axle seat. While these systems are highly advantageous, these extra elements add weight and cost to the suspension system, and, therefore, reduce the maximum permissible load that can be carried in jurisdictions where that weight is limited. They do, however, provide an acceptable long-lived means of transferring forces from axle to beam. Nevertheless, the transferring of forces between axle and beam in these systems still requires an intermediary component, such as an axle seat.

It is apparent from the above that there exists a need in the art for a suspension system which is lightweight, due to the number and simplicity of its component parts and its unique structure, and which at least equals the performance characteristics of the known suspensions, such as those of the highly advantageous type disclosed in the above-referenced VanDenberg patents. It is also desirable to provide a structure, as described above, which at the same time transmits substantially all of the deflections from the relatively rigid, axle-beam structure during the vehicle roll, walk or articulation to the resilient pivotal connection to the hanger bracket, rather than imposing deflections in the gusset plates, axle seats, or the like. It is a purpose of this invention to fulfill these and other needs in the art in a manner more apparent to the skilled artisan once given the following disclosure.

SUMMARY OF THE INVENTION

Generally speaking, this invention fulfills the above needs by providing an axle suspension system for a wheeled vehicle, comprising a beam having a resilient pivotal bushing said bushing being attached at one end of said beam to a hanger bracket and a spring means attached at the other end of said beam opposite said bushing thereof, wherein said beam extends longitudinally along said vehicle and includes a substantially U-shaped first member with two opposing sides integrally formed with a cross-member, and at least one second member rigidly attached to said U-shaped first member at one end, such that said second member is spaced away from said cross-member, thus to define a portion of an axle locus; said second member further comprising; a longitudinally extending plate means housing a first end, a second end located and forming one side of said axle locus and a third end intermediate said first and second ends to form a second side of said axle locus, said first, second and third ends being integrally connected by said plate means such that said plate means spans and closes at least a portion of the open end of said U-shaped first member.

In certain preferred embodiments, the second cross-member is comprised of two pieces rigidly secured together. Also, flanges are made of a single-piece construction and are rigidly attached to grooves in the beam. Finally, the second member contacts flanges adjacent a bend in the second member.

In another further preferred embodiment, substantially all of the deflections required by axle to vehicle articulations occur in a resilient pivotal connection to the hanger bracket, rather than attempting to accommodate substantial deflections imposing high unit loads or stresses in the gusset plates, axles seats, or the like.

In preferred embodiments, the suspensions of this invention consist essentially of a six-piece beam which is secured together, preferably by welding, to form a rigid, integral structure; a resilient bushing secured at one end of the beam; an axle secured near the other end of the beam, preferably by U-bolts and welding, and an air bag attached at the other end of the beam. In this way, not only are there fewer pieces employed to construct the rigid beam than former designs using the unique tri-functional bushing construction; but the unique structure allows substantially all of the forces experienced by the ground-engaging wheels and the resulting deflections to be transferred via the fairly rigid, axle beam structure to the resilient bushing and air spring.

The preferred suspensions, according to this invention, offer the following advantages: lightweight structure, ease of assembly and repair, good ride characteristics in both loaded and unloaded conditions, stability, durability, easy axle alignment, economy, high strength, and excellent braking characteristics. In many of the preferred embodiments, the combination of these factors of safety, economy and durability are optimized to an extent considerably higher than heretofore achieved in prior, known suspensions.

OBJECTS OF THE INVENTION

It is an object of the present invention to provide a simple, inexpensive suspension structure and axle connection that eliminates many unnecessary elements.

It is another object of the invention to provide a suspension system and axle connection that provides an efficient structure that allows the axle to both move and translate forces to the beam assembly in a manner such that no one individual element of the suspension structure is subjected to more stresses than any other element of the structure.

Yet another object of the invention is to provide these features in an inexpensive and lightweight structure.

This invention now will be described, with respect to certain embodiments thereof, as illustrated in the accompanying drawings, wherein:

BRIEF DESCRIPTION OF THE DRAWINGS

FIG. 3 is a side plan view of another embodiment of the present invention with axle atop the beam for low design heights;

FIG. 4 is an exploded view of the component parts of an embodiment of the present invention;

FIG. 5A is an exploded view of the component parts of a beam construction, according to the present invention;

FIG. 5B is an isometric view of the component parts shown in FIG. 5A, in an assembled state; and FIG. 6 is an end view taken along line A—A in FIG. 1 of a vehicle suspension system, according to the present invention.

DETAILED DESCRIPTION OF THE INVENTION

Figure 1:
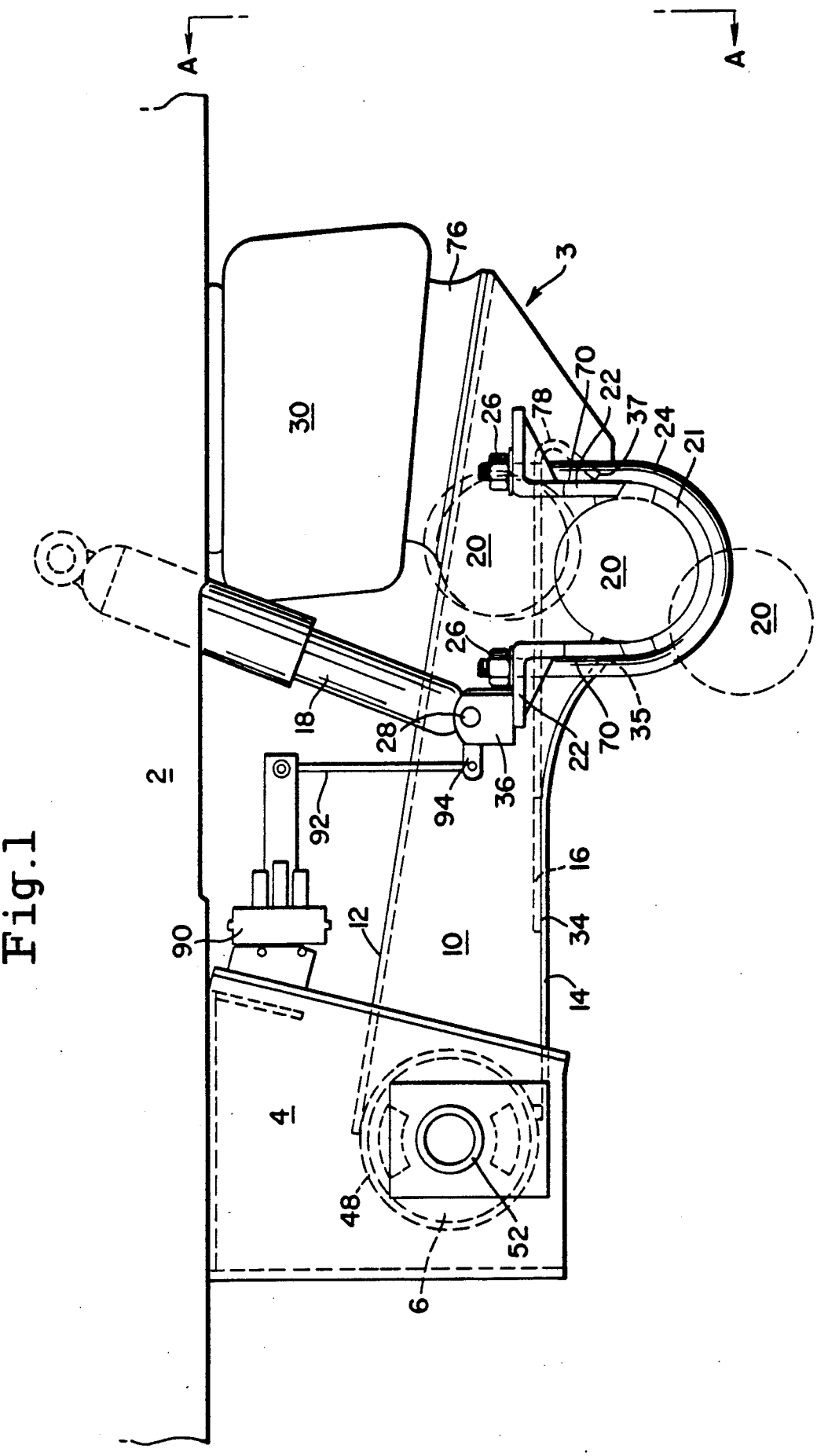
FIG. 1 is a side plan view of a vehicle suspension system, according to the present invention, with the beam atop the axle connection for higher design heights, with the arrangement capable of being inverted, with the axle atop the beam showing the versatility of the axle to be located at various ride heights; the dashed lines show the axle at various positions of axle travel.

With reference first to FIG. 1, there is illustrated an advantageous environment for use of the concepts of this invention. A conventional vehicle (not shown), such as a truck or trailer having longitudinal frame member 2 from which axle 20 extends in conventional fashion laterally across the vehicle at right angles to longitudinally extending beam assembly 3, is connected to ground-engaging wheels (not shown). FIG. 1 shows one side of the suspension. The illustrated suspension is duplicated on the other side of the vehicle (not shown). In general, the suspension system includes, at each side of the vehicle frame, one end of U-shaped beam assembly 3, pivotally connected to frame 2 of the vehicle by hanger bracket 4. The other end of U-shaped beam assembly 3 is rigidly connected to pedestal 76, such that pedestal 76 is rigidly connected at its other end to air bag assembly 30, or similar device, that is disposed between pedestal 76 and frame 2. Beam assembly 3 moves about its pivotal connection.

Looking at FIG. 1, in conjunction with FIGS. 4, 5A and 5B, U-shaped beam assembly 3 is pivotally attached to frame 2 by means of hanger bracket 4, via pivot connection 52. Plate 14, side plates 8 and 10, and cross-piece 12 are rigidly attached to cylindrical sleeve 48, preferably by welding. Inserted within sleeve 48 is resilient bushing 6. The preferred bushing construction, for the purposes of this invention, is that as shown in FIGS. 5-7 of U.S. Pat. No. 4,166,640 to VanDenberg, which has been used very successfully for many years by the assignee of this patent. Such a bushing has become known as the "TriFunctional" bushing. Such bushings usually contain an inner tube 52 for the resilient member.

Figure 2:
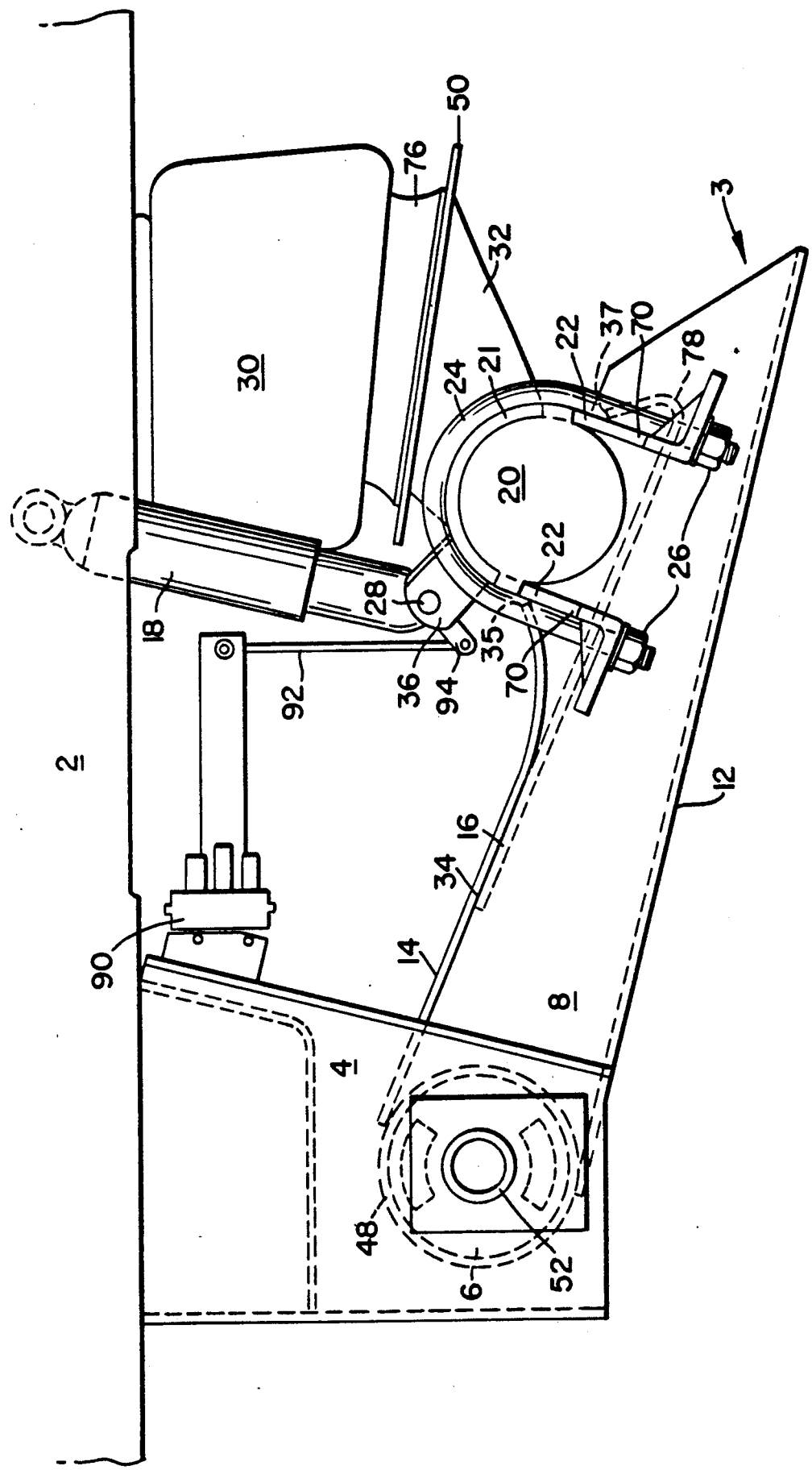
FIG. 2 is a side plan view of another embodiment of the present invention with the axle atop the beam for medium design heights.

Fastener bolt 56 is passed through first alignment collar 54, first aperture 68 in hanger bracket 4, first wear washer 58, liner (not shown), which is, preferably, constructed of Delrin or other similar material, inner metal sleeve 52 of bushing 6, second wear washer 58, second aperture 68, second alignment collar 54, and nut 60, in order to pivotally attach beam assembly 3 to hanger bracket 4. After final alignment, adjustment collars 54 are fixed by welding to bracket 4. Such an assembly provides a ready means for initial alignment and repair. Other attaching means that do not require a manually releasable fastening means, but, instead, employ a single or double plate fastening means, may also be used, as shown in FIGS. 1-3, and as are described in more detail in the commonly assigned patent application entitled Vehicle Suspension Beam Pivot Connection, U.S. Ser. No. 452,631, filed Dec. 19, 1989.

Also, as shown in FIGS. 1, 4, 5A and 5B, beam assembly 3 consists of six essential parts, which are U-shaped member 5, integral cross-member 12, plates 14 and 16, and flanges 22. One-piece, U-shaped member 5 is constructed to include a pair of opposing sides 8, 10 and cross-member 12. This U-shaped member 5 is preferably formed by a stamping and/or bending process. Plates 14 and 16 are secured together, preferably by welding along 34 to form a rigid second member 7. Plate 16 has bend 78 adjacent one end. This second member 7 is then rigidly secured, preferably by welding, to the open end of U-shaped member 5, and along opposing sides 8 and 10 and, thus, directly opposite cross-member 12. As can be seen, by bending the end of plates 14 and 16 in a manner so that these approach the axle 20 at substantially the same relative angles, an axle locus is provided between opposing sides 8 and 10, flange 22 and the two ends of these plates. The importance of this is discussed below.

Flanges 22 are rigidly secured to grooves 70 in opposing sides 8 and 10 of U-shaped member 5, preferably by welding. The terminal bent end of plate 14 contacts and is rigidly secured to one of flanges 22 by welding at point 35, while the terminal bent end of plate 16 contacts and is rigidly secured to the other flange 22 by welding at point 37. Torque boxes 9 are defined by vertical flanges 22, inclined portions of plates 14, 16 and the ears of plates 8, 10 forming a totally closed, essentially triangular, cross-sectional box extending laterally just ahead and behind axle 20. U-bolt 24 is placed around axle 20, through holes 72 in flanges 22 and washers 42 and nuts 26 are attached to U-bolt 24 and tightened in order to secure axle 20 to beam assembly 3. Also, axle 20 can be secured to flanges 22 such that contact points 35 and 37 are created at the points where plates 14 and 16, respectively, contact flanges 22 and axle 20. U-bolt spacer 21 is constructed such that it substantially encircles a portion of axle 20 and is secured to axle 20. Axle 20 is shown in dotted lines to depict a range of various possible positions it may occupy during use. It is given that the angle of beam assembly 3, with respect to frame 2, would change as those positions were attained. The length and orientation of shock absorber 18 would also change, as well as the dimensions of air bag 30.

As shown in FIG. 1, shock absorber pivot plate 36 is secured to one of flanges 22 by means of washer 42 and nut 26. Shock absorber pivot plate 36 includes holes 74 through which fastener 38 is passed in order to secure shock absorber 18 to pivot plate 36, such that the shock absorber pivots at 28 relative to beam 3. Nut 40 is attached to fastener 38 and tightened in order to secure shock absorber 18 to pivot plate 36. Alternatively, pivot plate 36 can be directly attached to flange 22, preferably by welding. Fewer pieces are required to attach shock absorber 18 to flange 22, which will reduce weight and cost, and substantially all forces created by shock absorber 18 near pivot point 28 will be transferred to flange 22. The other end of shock absorber 18 is attached to vehicle frame 2 by conventional means (not shown).

By this structure, such that there are formed contact points 35 and 37, respectively, between plates 14 and 16 and flanges 22, many of the forces transmitted to beam 3 by the axle, caused by deflections of the axle relative to frame 2, will be transferred to resilient bushing 6. Stated another way, because of this unique plate means 7, with an axle in place, many of the torsional forces created by the axle deflections which are experienced by the ground-engaging wheels that are caused by the terrain will be transferred through the axle to beam 3 and on to pivotal bushing 6, in a manner that still allows the axle to walk without stressing one of the individual parts of the axle attachment structure substantially more than any other of the individual parts of the axle attachment structure. This desired result is realized because opposing sides 8 and 10 form an axle locus in which axle 20 is placed. This axle locus, in conjunction with contacts 35, 37, flanges 22 and plates 14, 16, creates a box beam structure such that the axle deflections are, substantially evenly distributed across axle 20, i.e., torque box 9. This box beam structure is further assisted in creating the even deflection distribution across axle 20 by U-bolt 24 engagement. The deflections experienced by axle 20 are distributed over the entire torque box because plate 16 allows any deflection experienced by axle 20 to be substantially transferred from axle 20 to torque box 9, into suspension beam 3 and, ultimately, to bushing 6.

Put another way, the deflection characteristics of the axle 20 are approximately equal to the deflection characteristics of torque box 9. The mechanical impedances of the axle beam structure and torque box 9 are not only similar, but are such that minor variations can be accepted without over-stressing an individual element. The formation of the box beam structure by plates 8, 10, 12, 14 and 16 makes the box beam structure an excellent longitudinal beam structure that efficiently reacts to loading imposed by load inputs from the vehicle or axle 20. The loads transferred to plate 16 are then substantially transferred to plate 14 through weld 34. The loads are then substantially transferred from plates 14 and 16 to cylindrical sleeve 48 and, ultimately, through resilient bushing 6 into frame 2. This integral structure allows for loads imposed by axle 20 or the vehicle to be efficiently distributed and transmitted throughout the beam structure which provides essentially uniform stresses throughout the structure. This structure allows transference of substantially all articulation forces, which are the most severe forces imposed on the suspension and result in the largest beam loads and deflections to be transmitted to resilient bushing 6, without over-stressing axle 20, torque box 9 or beam assembly 3. Also, this structure is particularly well-suited to high strength, lightweight alloys and efficient use of materials.

Height control valve 90, which is any well-known conventional valve, is secured to hanger bracket 4. Rod 92 is connected to valve 90. Rod 92 is connected, in turn, to plate 94, which is connected in unison with shock absorber 18 at pivot point 28, to pivot plate 36.

Air bag 30 is secured to frame 2 by threaded fastener connections 62 and 63 which are rigidly attached to air bag 30, and which mate with washers 66 and 67 and nuts 64 and 65, respectively. Fastener connection 63 is hollow in order to allow air to escape from or enter into air bag 30 as controlled by height control valve 90.

In the ride mode, air bag 30, of course, accommodates most of the vertical deflections transferred by the axle to beam assembly 3 from the road-engaging wheels. Conversely, in the roll mode of the vehicle, the beam assembly 3 and bushing 6 will be the major elements involved in transmitting and accommodating axle deflections.

FIG. 2 contains another embodiment of the present invention. The elements in FIG. 2 that correspond with the elements in FIGS. 1, 4, 5A and 5B are numbered the same as in FIGS. 1, 4, 5A and 5B. As can be seen in FIG. 2, beam assembly 3 has been inverted in order to adjust the ride height between frame 2 and the center of axle 20. Downwardly extending side plates 32 are rigidly attached, preferably by welding, to U-bolt spacer 21 which goes substantially all the way across, which rides on top of axle 20. Also, shock bracket 36 is rigidly attached, preferably by welding to spacer 21. Spacer 21 is extended to become continuous across the top of axle 20. With respect to this particular embodiment of the present invention, as depicted in FIG. 2, air bag support plate 50 is attached to side plates 32 in order to provide support for air bag assembly 30, which generally includes pedestal 76.

FIG. 3 contains another embodiment of the present invention. The elements in FIG. 3 that correspond with the elements in FIGS. 1, 4, 5A and 5B have the same reference numbers as shown in FIGS. 1, 4, 5A and 5B. With respect to this particular embodiment of the present invention, as depicted in FIG. 3, air bag assembly 30 has been made taller but can be smaller in diameter. Also, the end of beam assembly 3 which extends beyond axle 20 and away from bushing 6 has been further extended such that side plates 32 have been eliminated and air bag support plate 50a has been modified to be rigidly attached, preferably by welding, directly to beam assembly 3. Finally, shock bracket 36 is rigidly attached, preferably by welding to spacer 21. Spacer 21 is extended to become continuous across the top of axle 20.

FIG. 6 depicts the connection between pedestal 76 and beam assembly 3 for larger air bags, when the pedestal is at least twice as large as the width of the beam. Pedestal 76 is attached to bracket 80, preferably by welding or casting. Bolt fastener 86 is secured through hole 82 in bracket 80 and a hole 87 in beam assembly 3, whereupon nut 84 is threaded on fastener 86 and bracket 80 is secured to beam assembly 3. In this respect, beam assembly 3 can be used as either a right-or-left-handed beam. Also, this connection reduces the size of the beam assembly width and the overall beam assembly weight, because the extra pedestal support plate has been eliminated.

The flexibility of use, as evidenced by FIGS. 1–3, is of particular importance, because there are many diverse vehicles that can utilize this beam suspension. It is to be noted that while FIG. 1 is depicted as showing a higher design height, FIGS. 2 and 3 depict medium and low design heights, respectively. This becomes critical, in that allowances can be made to accommodate the various maximum design heights that are allowed in applications where a specific design height is required.

Therefore, one of the advantages of this invention is that it reduces cost and manufacturing time, while still incorporating the aforementioned lighter weight aspects in a wide variety of vehicles, useful in varying geographical areas having different vehicle restrictions.

Once given the above disclosure, many other features, modifications and improvements will become apparent to the skilled artisan. Such features, modifications and improvements are, therefore, considered to be a part of this invention, the scope of which is to be determined by the following claims:

We claim:

1. An axle suspension system for a wheeled vehicle, comprising:
   a beam having a resilient pivotal bushing said bushing being attached at one end of said beam to a hanger bracket and a spring means attached at the other end of said beam opposite said bushing thereof, wherein said beam extends longitudinally along said vehicle and includes a substantially U-shaped first member with two opposing sides integrally formed with a cross-member, and at least one second member rigidly attached to said U-shaped first member and being of such a shape and so located, such that said second member is spaced away from said cross-member, thus to define a portion of an axle locus; and
   said second member comprising; a longitudinally extending plate means having a first and a second end said second end forming one side of said axle locus and a third end intermediate said first and second ends to form a second side of said axle locus, said first, second and third ends being integrally connected by said plate means such that said plate means spans and connects at least a portion of the opposing sides of said U-shaped first member.

2. An axle suspension system for a wheeled vehicle according to claim 1, wherein
   said axle locus is further defined by said second member including longitudinally spaced laterally extending plates which are connected to said second and third ends, respectively, of said second member.

3. An axle suspension system for a wheeled vehicle according to claim 2, wherein
   said axle locus further includes laterally spaced U-bolts for securing an axle to said longitudinally spaced laterally extending plates.

4. The axle suspension system for a wheeled vehicle according to claim 1, wherein
   said resilient bushing is surrounded by a cylindrical sleeve.

5. The axle suspension system for a wheeled vehicle according to claim 2, wherein
   said laterally extending plates are made of a one-piece construction.

6. The axle suspension system for a wheeled vehicle according to claim 2, further provided that
   said laterally extending plates are rigidly attached to grooves which are stamped in said beam.

7. The axle suspension system for a wheeled vehicle according to claim 2, wherein
   said second member contacts said laterally extending plates adjacent a bend in said second member.

8. The axle suspension system for a wheeled vehicle according to claim 1, wherein
   an air spring having a pedestal is attached to one end of said beam.

9. The axle suspension system for a wheeled vehicle according to claim 8, wherein
   said pedestal is at least twice as wide as said beam assembly, further comprising:
   a bracket means; and
   means such that said bracket means is secured to said pedestal and to said beam assembly in order to provide support for said pedestal.

* * * * *